United States Patent [19]

Zibin

[11] 3,862,401

[45] Jan. 21, 1975

[54] MULTI-PHASE PULSE COUNTER

[76] Inventor: Dzintar Karlovich Zibin, ulitsa Kveles, 15, korpus 6, kv. 10, Riga, U.S.S.R.

[22] Filed: Feb. 20, 1973

[21] Appl. No.: 333,465

[52] U.S. Cl. ...... 235/92 LG, 235/92 R, 235/92 SH, 328/48

[51] Int. Cl. ........................................... H03k 21/06

[58] Field of Search ...... 235/92 LG, 92 MB, 92 SH; 328/48

[56] References Cited

UNITED STATES PATENTS

| | | | |
|---|---|---|---|
| 3,239,764 | 3/1966 | Verma | 235/92 SH |
| 3,377,469 | 4/1968 | Solomon | 235/92 MB |
| 3,508,033 | 4/1970 | Turecki | 235/92 MB |

*Primary Examiner*—Gareth D. Shaw
*Assistant Examiner*—Robert F. Gnuse
*Attorney, Agent, or Firm*—Holman & Stern

[57] ABSTRACT

A multi-phase counter incorporates an $n$-stage $n$-stable trigger circuit, where $n = 6, 7, 8, \ldots\ldots\ldots$, the stable states of this circuit being represented as output signals in a binary code, and $n$ logic gates. The output of each stage of the trigger circuit is connected to the inputs of other $s$ stages, where $3 \leq s \leq n-3$. The output of each logic gate is connected to the input of the respective stage of the trigger circuit, the first inputs of the logic gates being the inputs of the counter, and the second input of each $k$-th logic gate, where $k = 1, 2, 3, \ldots\ldots, n$, is connected to the output of the $(k+a)$-th one of the stages, where the sum $(k+a)$ is taken by modulus $n$. In case both the logic gates and the stages of the trigger circuit are in the form of NOR logic elements, then $a = -d$, where $d$ is the smallest interval between the stages of the trigger circuit, that are in a binary 1 state. In case the stages of the trigger circuit are NOR logic elements, and the logic gates are AND logic elements, then $a = d \cdot v - 1$, where $v$ is the number of the stages in a binary 1 state.

2 Claims, 3 Drawing Figures

Patented Jan. 21, 1975

3,862,401

2 Sheets-Sheet 1

MULTI-PHASE PULSE COUNTER

BACKGROUND OF THE INVENTION

The invention relates generally to counters and more particularly, it relates to multi-phase pulse counters including circuits having multiple stable states, intended for incorporation in computing, digital and measuring apparatus as $n-1$-ary pulse counters, of ring counters by modulus $n$, pulse train frequency dividers with variable division factor, etc.

There is known a multi-phase pulse counter including an $n$-stage, $n$-stable trigger circuit and $n$ logic gates. In this known counter, the output of each stage of the trigger circuit is connected to the inputs of the preceding stage and of the successive stage; the output of each $k$-th gate circuit (where $k = 1, 2, \ldots, n$) is connected to the input of the $k$-th stage, and the output of the $k$-th stage is connected to the input of the ($k$-2)-th gate, the rest of the inputs of the gate circuit being the $n$-phase inputs of the counter.

A disadvantage of this known multi-phase counter is the fact that the $n$-stable trigger circuits used therein, where $n = 6, 7, 8, 9, 10, 11, \ldots$, have, respectively, $2+8, 3+9, (2+5)+10, 11+11$ stable states, instead of the required $n$ stable states, the first summand in the above-specified sums representing the number of non-working states, and the second summand representing the number of the working states. The presence of redundant, non-working states substantially affects the reliability of the performance of the counter, due to the fact that when the counter is in one of the above-specified non-working states, normal operation thereof becomes impossible. In this case, it takes either intervention on the operator's part, or an action of some additional check-up and control apparatus to restore the counter to its operating state; otherwise, the above-specified known counter is operable only when $n$ equals either 5 or 7.

SUMMARY OF THE INVENTION

It is an object of the present invention to develop a circuitry of a multi-phase pulse counter that will positively prevent appearance of non-working states of the counter.

It is another object of the present invention to develop a circuitry of a multi-phase pulse counter having a variable reset factor attaining values $1, 2, 3, \ldots, n-1$, where $n$ is the number of the phases of the counter.

It is a further object of the present invention to develop a circuitry of a multi-phase pulse counter operable in a reversible mode, i.e. capable of counting both "up" and "down."

These and other objects are attained in a multi-phase pulse counter including an $n$-stage, $n$-stable trigger circuit, where $n = 6, 7, 8, \ldots$, of which the stable states are represented as output signals in the form of binary digits, and $n$ logic gates, the output of each one of the $n$ gates being connected to the input of the respective stage of the trigger circuit, the first inputs of said gates being the inputs of said counter, wherein, in accordance with the present invention, the output of each stage of the $n$-stage trigger circuit is connected to the inputs of $s$ other stages thereof, where $3 \leq s \leq n-3$, the second input of each $k$-th one of the gates, where $k = 1, 2, 3, \ldots, n$, being connected to the output of the ($k + l$)-th stage, where the sum ($k + a$) is taken by modulus $n$, in which counter, in case all of the gates and the stages of the $n$-stable trigger circuit are NOR logic elements, the expression $a = -d$ is true, where $d$ is the smallest interval between those of the stages of the trigger circuit, which are in a binary 1 state; alternatively, in case the stages of the trigger circuit are NOR logic elements and the gates are AND logic elements, then the expression $a = d \cdot v - 1$ is true, where $v$ is the number of the stages of the trigger circuit, that are in a binary 1 state;

A multi-phase pulse counter constructed in accordance with the present invention features a simple and reliably performing circuitry, however great the number $n$ might be ($n > 5$), preventing the counter attaining the non-working states.

The herein disclosed counter is operable with various values of the reset factor, both for up counting and for down counting.

BRIEF DESCRIPTION OF THE DRAWINGS

The present invention will be further described in connection with embodiments thereof, with reference being had to the accompanying drawings, wherein.

DETAILED DESCRIPTION OF THE PREFERRED EMBODIMENT

Figures 1, 2:
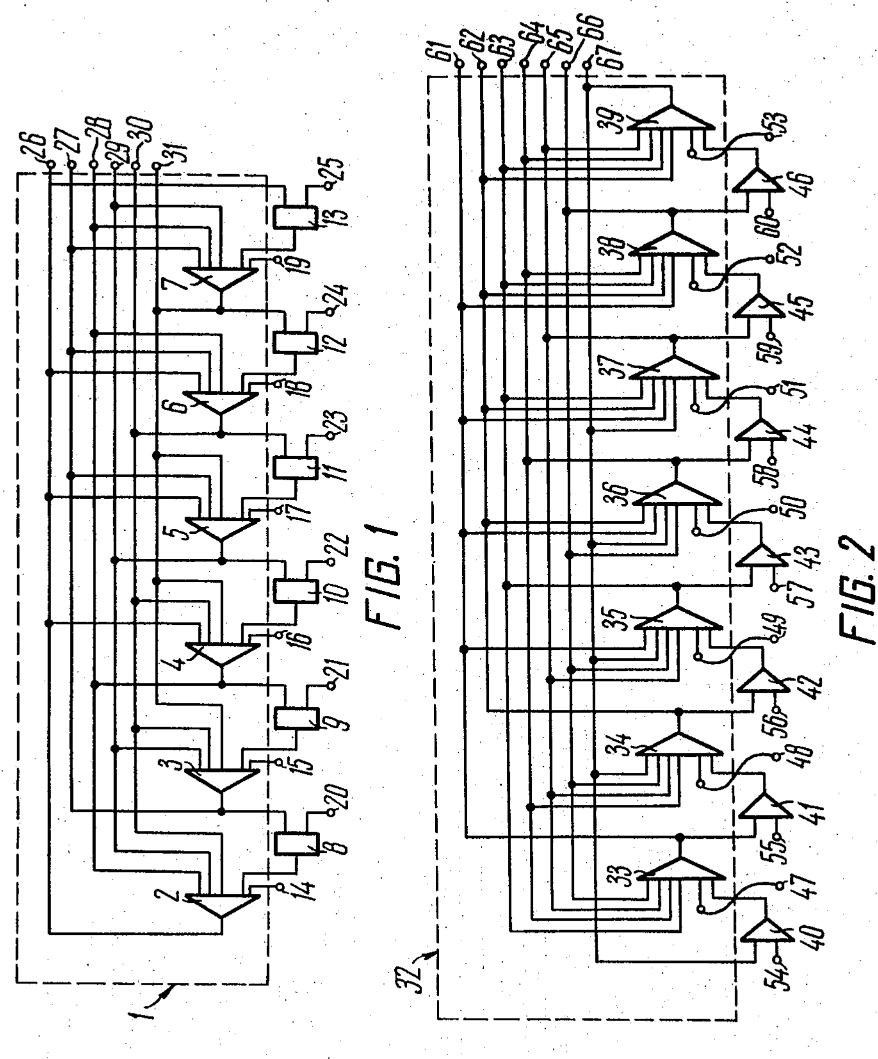
FIG. 1 is a circuit diagram of a six-phase pulse counter constructed in accordance with the invention.
FIG. 2 is a circuit diagram of a seven-phase pulse counter constructed in accordance with the invention.

Referring now in particular to the appended drawings (FIG. 1), the six-phase pulse counter includes a six-stage trigger circuit 1 having stages 2, 3, 4, 5, 6 and 7, each stage being a NOR logic element or gate and six gates 8, 9, 10, 11, 12 and 13, each being an AND gate, the counter further having conditioning or initial condition setting inputs 14, 15, 16, 17, 18 and 19 and count inputs 20, 21, 22, 23, 24 and 25, as well as outputs 26, 27, 28, 29, 30 and 31.

The stages of the trigger circuit 1 are interconnected in the following way: the output of the stage 2 is connected to the inputs of the stages 4, 5, 6; the output of the stage 3 is connected to the inputs of the stages 5, 6, 7; the output of the stage 4 is connected to the inputs of the stages 6, 7, 2; the output of the stage 5 is connected to the inputs of the stages 7, 2, 3; the output of the stage 6 is connected to the inputs of the stages 2, 3, 4; the output of the stage 7 is connected to the inputs of the stages 3, 4, 5.

One of the inputs of each one of the stages 2, 3, 4, 5, 6, 7 is included into the set of conditioning inputs 14, 15, 16, 17, 18 and 19 of the herein disclosed counter. The outputs of the stages 2, 3, . . . . . , 7 form the set of outputs 26, 27, . . . , 31 of the counter.

The above-described trigger circuit 1, according to the selected pattern of interconnection of the stages 2, 3, . . . . , 7, has six stable states expressed in binary digits as 110000, 011000, 001100, 000110, 000011, and 100001, where the $k$-th digit represents the state of a respective $k$-th stage, and the state of this stage is represented as the binary signal at the output of this stage.

In general, in an $n$-stage, $n$-stable trigger circuit, there are $v$ stages which are in a binary 1 state at the same time, and in the presently described embodiment $v = 2$.

In general, in an $n$-stage, $n$-stable trigger circuit, the smallest interval between the stages thereof which are in a binary 1 state can be expressed as $d$, and in the presently described embodiment $d = 1$. The interval is expressed as a difference (by modulus $n$) between the serial numbers of the stages attaining a binary 1 state. Thus, in the herein disclosed embodiment, in the first-mentioned state of the trigger circuit 1, i.e. 110000, $d = 2 - 1 = 1$. The value of $d$ may be determined for any one of the $n$ stable states. If, for instance, the state of a trigger circuit is expressed as 1010100 . . . 0, then $d = 3 - 1 = 2$, or else $d = 5 - 3 = 2$.

The values of $v$ and $d$ which are characteristic of the $n$-stage, $n$-stable trigger circuit employed in the herein disclosed counter determine the pattern of connection of the logic gates 8, 9, . . . . . , 13 (in the presently described embodiments these logic gates are AND gates) to the trigger circuit 1, as it will be described in more detail hereinbelow.

The output of each $k$-th gate (where $k = 1, 2, \ldots, n$) is connected to the input of the $k$-th stage of the trigger circuit 1. The first input of this $k$-th gate is the $k$-th count input of the herein disclosed counter. The second input of the $k$-th gate is connected to the output of the $(k+a)$-th stage (the sum $k+a$ being taken by modulus $n$). Here, the value $a$ depends on the kind of the logic elements employed as the stages of the trigger circuit, as well as on the kind of the logic elements employed as the logic gates, namely: in case both both the stages of the $n$-stable trigger circuit and the logic gates are in the form of NOR gates, then $a = -d$; alternatively, in case the stages of the trigger circuits are NOR logic elements and the gates are AND gates, then $a = d \cdot v - 1$.

In the presently described embodiment the stages 2, 3, . . . , 7 of the trigger circuit 1 are NOR gates, and the gates 8, 9, . . . , 13 are AND gates, whereby $a = d \cdot v - 1 = 1 \cdot 2 - 1 = 1$. Correspondingly, in the pulse counter illustrated in FIG. 1 the second input of the first gate 8 is connected to the output of the second stage 3; the second input of the second gate 9 is connected to the output of the third stage 4; the second input of the $k$-th gate is connected to the output of the $(k + a)$-th $=(k + 1)$-th stage; . . . . . . . . . , the second input of the last (the sixth) gate 13 is connected to the output of the first stage 2 (because when $k = n$ we have $n + 1$ by modulus $n$ equal to 1).

The pulse counter which is another embodiement of the present invention, illustrated in FIG. 2, includes a seven-stage trigger circuit 32 including seven stage 33, 34, 35, 36, 37, 38, 39, each in the form of a NOR logic element, and seven logic gates 40, 41, 42, 43, 44, 45, 46, each in the form of a NOR gate, too. This counter likewise has inputs 47, 48, 49, 50, 51, 52, 53 which are the counter conditioning inputs, as well as the count inputs 54, 55, 56, 57, 58, 59, 60 and the outputs 61, 62, 63, 64, 65, 66, 67. The stages 33 to 39 of the trigger circuit 32 are interconnected as follows: the output of the stage 33 is connected to the inputs of the stages 35, 36, 37, 38; the output of the stage 34 is connected to the inputs of the stages 36, 37, 38, 39; the output of the stage 35 is connected to the inputs of the stages 37, 38, 39, 33; the output of the stage 36 is connected to the inputs of the stages 38, 39, 33, 34; the output of the stage 37 is connected to the inputs of the stages 39, 33, 34, 35; the output of the stage 38 is connected to the inputs of the stages 33, 34, 35, 36; the output of the stage 39 is connected to the inputs of the stages 34, 35, 36, 37.

One of the inputs of each one of the stages 33 to 39 is included into the set of the counter conditioning inputs 47 to 53. The outputs of the stages 33 to 39 form the set of the outputs 61 to 67 of the counter.

The trigger circuit has seven stable states represented in binary digits as 1110000; 0111000; 0011100; 0001110; 0000111; 1000011, 1100001.

The output of the $k$-th gate 40 to 46 is connected to the input of the $k$-th stage 33 to 39 of the trigger circuit 32. The first input of the $k$-th gate 40 to 46 is the respective $k$-th count input of the herein disclosed counter. In the presently described case, when the gates 40 to 46 are in the form of NOR gates, the following expression is true: $a = -d = -1$, because $3 - 2 = 2 - 1 = 1$; and, consequently, $k + a = k + (-1) = k - 1$. Accordingly, the second input of the $k$-th gate 40 to 46 is connected to the output of the $(k - 1)$-th stage 33 to 39 of the trigger circuit 32.

Figure 3:
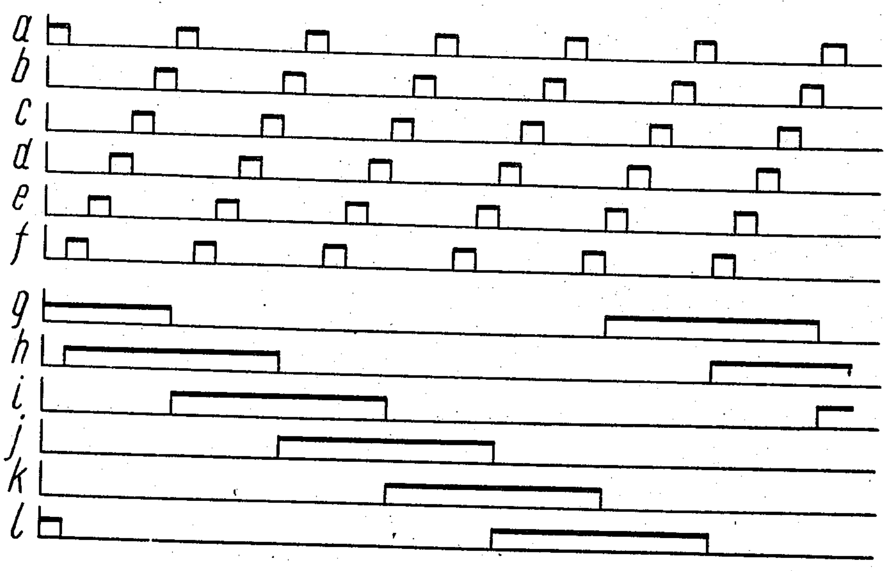
FIG. 3 *a, b, c, d, e, f, g, h, i, j, k, l* are time-related signal voltage diagrams illustrating the operation of the counter having the circuitry shown in FIG. 1.

FIG. 3 *a, b, c, d, e, f, g, h, j, k, l* shows time-related signal voltage diagrams at the respective different terminals of the counter illustrated in FIG. 1, viz;:

FIG. 3 *a* — signal voltage at the input 20 ;
FIG. 3 *b* — signal voltage at the input 21 ;
FIG. 3 *c* — signal voltage at the input 22;
FIG. 3 *d* — signal voltage at the input 23 ;
FIG. 3 *e* — signal voltage at the input 24 ;
FIG. 3 *f* — signal voltage at the input 25;
FIG. 3 *g* — signal voltage at the output 26 ;
FIG. 3 *h* — signal voltage at the output 27 ;
FIG. 3 *i* — signal voltage at the output 28 ;
FIG. 3 *j* — signal voltage at the output 29 ;
FIG. 3 *k* — signal voltage at the output 30 ;
FIG. 3 *l* — signal voltage at the output 31.

The X-axis of the last-mentioned diagrams is calibrated in the units of time of coming of the successive pulses, while the Y-axis thereof is calibrated in the values of signal voltage (arbitrarily represented in the form of binary digits).

Let us consider the operation of the counter illustrated in FIG. 1.

All the electric signals at the inputs and at the outputs of this counter, as well as at the inputs and outputs of the logic elements incorporated in the counter are taken to be represented as binary digits, and thus are arbitrarily designated as binary 0 and binary 1. The operation of the trigger circuit 1 in this counter amounts to the trigger circuit retaining or memorizing the condition into which it has been set and attaining a different condition following the coming of corresponding input signals.

When the trigger circuit is initially conditioned, it operates according to the following Table 1.

Table 1

| | | | | | | |
|---|---|---|---|---|---|---|
| $Y_i$ | 001111 | 100111 | 110011 | 111001 | 111100 | 011110 |
| $Q_i$ | 110000 | 011000 | 001100 | 000110 | 000011 | 100001 |

where $Y_i$ is the conditioning word, i.e., the set of binary signals at the respective counter conditioning inputs 14, 15, 16, 17, 18 and 19;

$Q_i$ is the condition into which the trigger is set by this conditioning word $Y_i$, irrespectively of the condition it has been set to prior to the arrival of this conditioning word.

It can be seen from the above-said that, in order to set the counter into a stable state $Q_i$, a conditioning word $Y_1 = \bar{Q}_i$ is to be supplied to the conditioning inputs 14, 15, 16, 17, 18, 19.

Upon the coming of successive input signals, i.e., the signals to be counted, the trigger circuit 1 operates, as shown in the following Table 2.

Table 2

| | | | | | | | |
|---|---|---|---|---|---|---|---|
| $X_i$ | 100XXX | X100XX | XX100X | XXX100 | 0XXX10 | 00XXX1 | 000000 |
| $Q_{i-1}$ | 110000 | 011000 | 001100 | 000110 | 000011 | 100001 | |
| $Q_i$ | 011000 | 001100 | 000110 | 000011 | 100001 | 110000 | |

where $X_i$ is a binary word wherein each digit indicates the value of the binary signal at the output of the respective gate (i.e., at the input of the respective stage);

X is an irrelevant digit which may be either binary 1 or binary 0 (i.e., a digit which is not responded to);

$Q_{i-1}$ is the state of the trigger circuit prior to the coming of the binary word $X_i$;

$Q_i$ is the state of the trigger circuit, into which it is set by the coming of the binary word $X_i$.

Thus, the first column of Table 2 means that the trigger circuit is a state $Q_{i-1}$ = 110000 is set by the incoming word $X_i$ = 100XXX into a state $Q_i$ = 011000. The last column in Table 2 means that when $X_i$ = 000000, the trigger circuit maintains its former state $Q_{i-1}$.

In the initial condition of the counter, when all the signals at the counts 20, 21, . . . , 25 (to be hereinafter referred to as the input word) are binary 0, the binary signals at the outputs of the gates 8, 9, . . . , 13 are also binary 0 (i.e. $X_o$=000000). In this case, the trigger circuit 1 may occupy any one of its six states. Let us assume, for the sake of illustration, that it is in a state $Q_o$ = 110000. Then, if a signal 1 is sent in succession to the inputs 24, 23, 22 and 21 of the counter, as is illustrated in FIGS. 3 *e, d, c, b*, the state of the counter does not change. If a binary signal 1 is sent to the input 20 (FIG. 3 *a*), the trigger circuit, in accordance with Table 2 hereinabove, changes its state $Q_1$ = 011000 to a state $Q_2$ = 001100. Thereafter the operation of the counter is continued in a similar way, as it can be seen in FIGS. 3 *a* to 1. The full cycle is completed when there is sent to the input 25 (FIG. 3 f) on the counter the sixth pulse, which means that the trigger circuit 1 changes its fifth state $Q_5$ = 100001 to the initial state $Q_o$ = 110000.

The operation of the counter may be represented as a list of the input words and corresponding states of the trigger circuit 1 (see Table 3 hereinbelow).

Table 3

| Input Words $X_i$ | States $Q_i$ of the Trigger Circuit | |
|---|---|---|
| 000001 | 110000 | |
| 000010 | 110000 | |
| 000100 | 110000 | |
| 001000 | 110000 | |
| 010000 | 110000 | |
| 100000 | 011000 | |
| 000001 | 011000 | |
| 000010 | 011000 | |
| 000100 | 011000 | |
| 001000 | 011000 | |
| 010000 | 001100 | a single |
| 100000 | 001100 | |
| 000001 | 001100 | full operation |
| 000010 | 001100 | |
| 000100 | 001100 | cycle |
| 001000 | 000110 | |
| 010000 | 000110 | |

Table 3-Continued

| Input Words $X_i$ | States $Q_i$ of the Trigger Circuit | |
|---|---|---|
| 100000 | 000110 | |
| 000001 | 000110 | |
| 000010 | 000110 | |
| 000100 | 000011 | |
| 001000 | 000011 | |
| 010000 | 000011 | |
| 100000 | 000011 | |
| 000001 | 000011 | |
| 000010 | 100001 | |
| 000100 | 100001 | |
| 001000 | 100001 | |
| 010000 | 100001 | |
| 100000 | 100001 | |
| 000001 | 110000 | - the initiation of a successive similar cycle, etc. |
| 000010 | 110000 | |

It can be easily observed from Table 3 that the trigger circuit (and, correspondingly, the counter itself) attains a next successive state following the arrival of every fifth input signal.

In the example described hereinabove the input words $X_i$ contain each a single binary 1, while the corresponding states $Q_i$ of the trigger circuit (i.e., of the counter) contain each two binary 1. Therefore, to form a multi-digit counter, it is necessary to introduce decoding means between the outputs of the first digit and the inputs of the second digit, between the outputs of the second digit and the inputs of the third digit, and so on. The structure of such decoding means can be fairly simple; thus, in the presently described embodiment such decoding means includes *n* double-input AND gates. Being certain that the structure of such decoding means is generally known, we are not going to describe it in detail in the present disclosure.

The logic AND gates making up such decoding means are connected each by its respective output to a signal count input of the successive digit of the counter, i.e, to one input of the corresponding gate of the counter.

As it has been already mentioned hereinabove, in the presently described embodiment of the invention the gates are in the form of AND gates. However, it is generally known that two serially connected AND gates can be replaced by a single AND gate having a sufficiently great number of inputs (i.e., the number of the inputs should be equal to the total number of the inputs of the AND gates being replaced, minus one). Therefore, the functions of the decoding means can be performed by the very AND gates incorporated in the counter, provided it is found desirable from the design, production and other points of view.

Many a practical application requires a reversible counter. Subjected to but slight modifications, the herein disclosed counter is operable as such a reversible counter. Let us consider these modifications.

The herein disclosed counter counts up, but the task of constructing a counter which will count down is simple enough. To attain this, all the gates should be connected to the trigger circuit in the directions opposite Table 5

| | | | | | | | | |
|---|---|---|---|---|---|---|---|---|
| $X_i$ | 1000XXX | X1000XX | XX1000X | XXX1000 | 0XXX100 | 00XXX10 | 000XXX1 | 1111111 |
| $Q_{i-1}$ | 1110000 | 0111000 | 0011100 | 0001110 | 0000111 | 1000011 | 1100001 | $Q_{i-1}$ |
| $Q_i$ | 0111000 | 0011100 | 0001110 | 0000111 | 1000011 | 1100001 | 1110000 | $Q_{i-1}$ |

to those described hereinabove, and the input signals should be applied to the count inputs in a reversed order. Thus, the gate 8 in the counter illustrated in FIG. 1 should now have its input connected to the output of the first stage 2 and have its output connected to the input of the second stage 3 (the rest of the gates should be reconnected accordingly). This considered, to create a reversible counter, another group of *n* gates should be added to the counter illustrated in FIG. 1, these additional gates being connected, as it has been described in the preceding sentence. In this case every gate should have three inputs, the third inputs of the gates 8 to 13 being interconnected and forming the first control input; the third inputs of the additional *n* gates being also interconnected to form the second control input; the first input of each one of the additional gates being connected to the respective one of the count inputs 20 to 25.

Here, a signal 1 applied to the first control input is a command to count up, while a signal 1 at the second control input is a command to count down.

The herein disclosed counter can be operated with different reset factors.

When the input words contain each a single binary 1, i.e.,

000001
000010
000100
001000
010000
100000
000001, etc. , then the reset factor of the counter equals $n-1 = 6 - 1 = 5$.

Should the input words contain each two adjacent binary 1 digits, e.g.,

000011
000110
———
100001, etc., then the reset factor of the counter equals $n - 2 = 6 - 2 = 4$.

In general, the reset factor equals $n - p$, where $p = 1, 2, \ldots n - 1$ and expresses the number of binary 1 digits in the input word. In other words, *p* expresses the duration of input pulses, defined as the number of time steps. Therefore, with any $n \geqslant 5$ the counter is operable in a mode when the reset factor equals any one of integers $n - 1, n - 2, \ldots, 2, 1$.

Let us now consider the operation of the counter of which the circuitry is shown in FIG. 2. The operation of this counter is similar to that described hereinabove.

When the counter is being initially conditioned, the operation of the trigger circuit 32 is, as shown in Table 4 to follow.

Table 4

| | | | | | | | |
|---|---|---|---|---|---|---|---|
| $Y_i$ | 0000011 | 1000111 | 1100011 | 1110001 | 1111000 | 0111100 | 0011110 |
| $Q_i$ | 1110000 | 0111000 | 0011100 | 0001110 | 0000111 | 1000011 | 1100001 |

Upon the coming of input pulses, the trigger circuit 32 operates as shown in the following Table 5.

In the initial condition, when the signals at all of the count inputs 54 to 60 equal binary 1, the binary signals at the outputs of the gates 40 to 46 are 0, i.e., $X_0 = 0000000$. The trigger circuit, in this case may be in any one of the stable states $Q_i$ listed in Table 4 hereinabove. Let us assume that it is in a state $Q_0 = 1110000$. Then, if a signal 1 is sent in succession to the inputs 60, 59, 58, 57, 56 and 55, the state of the counter is not altered. If, however, a binary signal 1 is sent to the input 54, then the trigger circuit 32 alters its state from $Q_0$ to $Q_1 = 0111000$ in accordance with Table 5 hereinabove. Concurrent feeding of a binary signal 1 in succession to the inputs 60; 59, 58, 57 and 56 does not alter the state of the counter. When a signal 1 is fed to the input 55, the trigger circuit 32, in accordance with Table 5, alters its state from $Q_1$ to $Q_2 = 0011100$. The counter thereafter continues its operation in a similar manner. Following every sixth input pulse the counter shifts to its next successive state, the total number of these states being seven, whereby the counter completes its full operation cycle in $6 \times 7 = 42$ pulses.

Thus, the presently described embodiment illustrated in FIG. 2 differs from the previously described counter (FIG. 1) in that here signals 1 are normally supplied to the inputs thereof, while a count pulse is a binary 0, which results from the fact that the last-described embodiment incorporates NOR elements for its gates 40 to 46. The last-described counter is likewise operable in different modes, i.e. its reset factor may be equal to 6, 5, 4, 3, 2, or 1.

A counter illustrated in FIG. 1 may be alternatively built from logic elements NAND (the stages 2 to 7 of the trigger circuit) and OR logic gates. In this case its operation is identical to the described in connection with FIG. 1, the difference being in that the sense of each input, internal and output signal thereof is inverted in relation to the sense of the corresponding signals of the counter illustrated in FIG. 1.

The counter illustrated in FIG. 2 may incorporate NAND elements (the stages 33 to 39 of the trigger circuit 32 and the gates 40 to 46) instead of AND gates, in which case it will be likewise different in that the sense of every input, internal and output signal will be inverted in relation to the signals in the counter illustrated in FIG. 2. The above-said is a direct outcome of the dual character of Boolean algebra.

What is claimed is:

1. A multi-phase pulse counter comprising an *n*-stage, *n*-stable trigger circuit, where $n = 6, 7, 8, \ldots$, of which the stable states are represented as output signals in a binary code; said stages of said trigger circuit being made in the form of NOR logic elements; *n* logic gates formed also as NOR logic elements; said *n*-stage trigger circuit having the output of each one of said stages thereof connected to the inputs of *s* other stages thereof, where $3 \leqslant s \leqslant n - 3$; the output of each one of said gates being connected to the input of the respective one of said stages of said trigger circuit, the first input of each said gate being the respective count input of said counter, the second inputs of said gates being connected to the outputs of said stages of said trigger circuit so that the second input of each $k$-th gate, where $k = 1, 2, 3, \ldots n$, is connected to the output of the $(k + a)$-th one of said stages, where said sum $(k + a)$ is taken by the modulus $n$, and $a = -d$, where $d$ is the smallest interval between those of said stages of said trigger circuit which are in a binary 1 state.

2. A multi-phase pulse counter comprising an $n$-stage, $n$-stable trigger circuit, where $n = 6, 7, 8, \ldots$, of which the stable stages are represented as output signals in a binary code; each said stages of said trigger circuit being made in the form of a NOR logic element; $n$ logic gates being made in the form of AND gates; said $n$-stage trigger circuit having the output of each said stage thereof connected to the inputs of $s$ other stages thereof, where $3 \leq s \leq n-3$; the output of each one of said gates being connected to the input of the respective one of said stages of said trigger circuit, the first inputs of said gates being the count inputs of said counter, the second inputs of said gates being connected to the outputs of said stages of said trigger circuit so that the second input of each $k$-th one of said gates, where $k = 1, 2, 3, \ldots, n$ is connected to the output of the $(k + a)$-th one of said stages, where the sum $(k + a)$ is taken by modulus $n$, and $a = d \cdot v - 1$, where $d$ is the smallest interval between those of said stages of said trigger circuit, which are in a binary 1 state, and $v$ is the number of those of said stages of said trigger circuit, which are in a binary 1 state.

* * * * *